United States Patent
Wu

(10) Patent No.: US 9,459,516 B2
(45) Date of Patent: Oct. 4, 2016

(54) MEMS-BASED RAPIDSCAN DEVICE AND PROJECTOR HAVING SAME

(71) Applicant: HON HAI PRECISION INDUSTRY CO., LTD., New Taipei (TW)

(72) Inventor: Kai-Wen Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/311,374

(22) Filed: Jun. 23, 2014

(65) Prior Publication Data

US 2014/0375969 A1 Dec. 25, 2014

(51) Int. Cl.
G03B 21/00 (2006.01)
H04N 9/31 (2006.01)
G02B 26/08 (2006.01)
G02B 26/10 (2006.01)

(52) U.S. Cl.
CPC ........... *G03B 21/00* (2013.01); *G02B 26/0833* (2013.01); *G02B 26/101* (2013.01); *G02B 26/105* (2013.01); *H04N 9/3129* (2013.01)

(58) Field of Classification Search
CPC ............ G02B 26/0833; G02B 26/101; G02B 26/105; G03B 6/3518; G03B 21/00; G03B 21/008; H04N 9/3129; H04N 5/7458
See application file for complete search history.

(56) References Cited

U.S. PATENT DOCUMENTS

| 6,690,885 B1 * | 2/2004 | Aksyuk | ................ G02B 6/3518 385/119 |
| 2013/0009945 A1 * | 1/2013 | Davidson | ........... G02B 26/0833 345/419 |

\* cited by examiner

*Primary Examiner* — Sultan Chowdhury
*Assistant Examiner* — Magda Cruz
(74) *Attorney, Agent, or Firm* — ScienBiziP, P.C.

(57) ABSTRACT

A device projecting images by micro electro-mechanical system (MEMS) technology mirrors includes a base, a first substrate, a first reflective mirror, a second substrate, and a second reflective mirror. The first substrate and the second substrate are adjacently positioned on the base. The first reflective mirror is formed on the first substrate by a micro electro-mechanical system (MEMS) technology and configured for receiving a light beam and rotating in two directions under control of the MEMS for reflect the received light in two directions. The second reflective mirror is formed on the rotatable second substrate to receive the image and be rotated, thus further adjusting the range of the projected images.

15 Claims, 2 Drawing Sheets

MEMS-BASED RAPIDSCAN DEVICE AND PROJECTOR HAVING SAME

FIELD

The present disclosure relates to projector technology.

BACKGROUND

Projectors can use a MEMS-based rapidscan device that has reflective mirrors. The reflective mirrors can be controlled to reflect light in two directions, such as horizontally and vertically. In this way, the light beams form images on a screen.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Embodiments of the present disclosure will be described with reference to the drawings.

Figure 1:
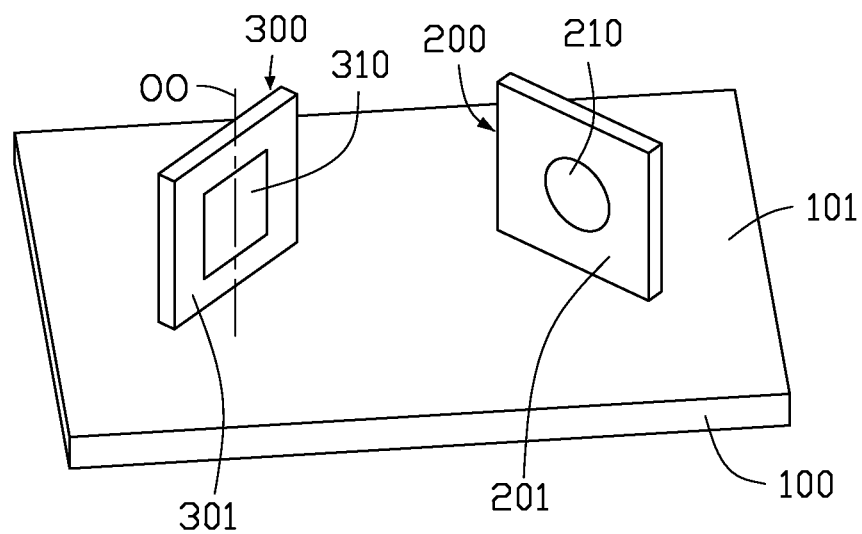
FIG. 1 is an isometric view of a rapidscan device according to an embodiment.

FIG. 1 illustrates a rapidscan device 10 according to an embodiment. The rapidscan device 10 has a base 100, a first substrate 200, a first reflective mirror 210, a second substrate 300, and a second reflective mirror 310.

The base 100 includes a first surface 101 which can be an upper surface.

The first substrate 200 includes a second surface 201 and the first reflective mirror 210 is formed in the second surface 201. The first substrate 200 and the first reflective mirror 210 can be constructed with micro electro-mechanical systems (MEMS) technology. The first substrate 200 can be made of silicon, polymers, metals, or ceramics. Various semiconductor technologies, such as depositioning, patterning, photolithography, and etching can be employed on the first substrate 200 to form the first reflective mirror 210 in the first substrate 200. The first reflective mirror 210, when activated, can rotate relative to the first substrate 200 in two orthogonal directions. As such, light reflected by the first reflective mirror 210 can be output in two directions, such as vertically and horizontally, to form a two-dimensional image. That is, the first reflective mirror 210 can project a viewable image by rapid movement. In this embodiment, the first substrate 200 is rectangular and the first reflective mirror 210 is circular.

The second substrate 300 includes a third surface 301 and the second reflective mirror 301 is formed in the third surface 301. For example, the second substrate 300 and the second reflective mirror 310 can also be constructed with MEMS technology. The second substrate 300 can be made of silicon, polymers, metals, or ceramics. Various semiconductor technologies, such as depositioning, patterning, photolithography, and etching can be employed on the second substrate 300 to form the second reflective mirror 310 in the second substrate 300. The second reflective mirror 310, when activated, can rotate about axis OO in FIG. 1. As such, a direction of reflection of light by the second reflective mirror 310 can be changed by rotating the second reflective mirror 310. In this embodiment, the second substrate 300 is rectangular and the second reflective mirror 310 is also rectangular.

In assembly, the first substrate 200 and the second substrate 300 are positioned on the first surface 101 and are arranged adjacent to each other. The second surface 201, the third surface 301, and the axis OO are substantially perpendicular to the first surface 101. The first reflective mirror 210 substantially faces the second reflective mirror 310. An included angle θ between the second surface 201 and the third surface 301 falls into a range from about 90 to about 150 degrees.

Figure 2:
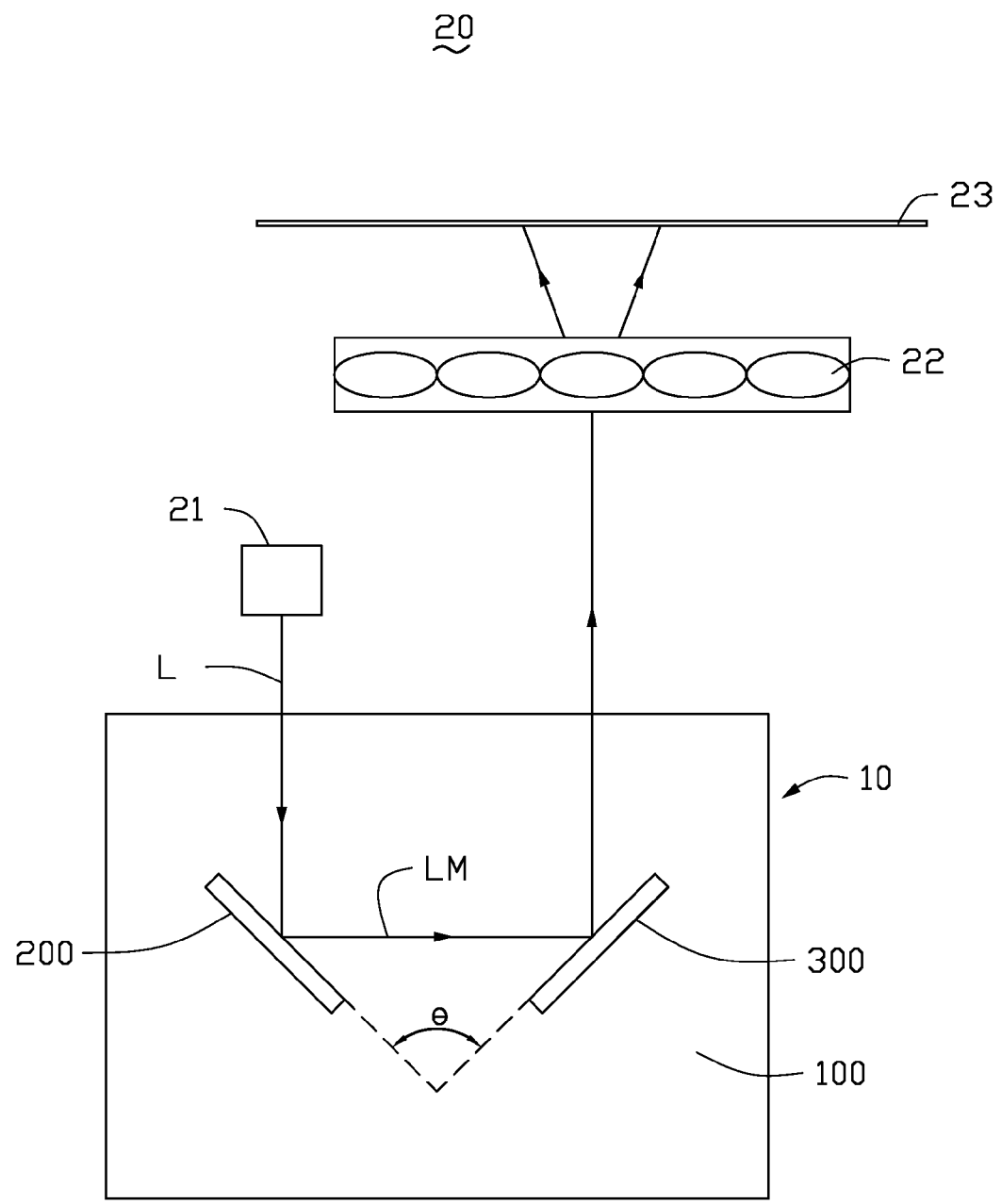
FIG. 2 is a planar view of a projector according to another embodiment.

FIG. 2 illustrates a projector 20, according to another embodiment. The projector 20 includes the rapidscan device 10, a light source 21, an array of projection lenses 22, and a screen 23.

The light source 21 can be a laser source which can emit a light beam L. The rapidscan device 10 is positioned in a light path of the light beam L and modulates the light beam L into a modulated light beam LM, the first reflective mirror 210 modulating the light beam L into the modulated light beam LM and reflecting the modulated light beam LM to the second reflective mirror 310. The array of projection lenses 22 and the screen 23 are positioned along a light path of the modulated light beam LM.

In operation, the second substrate 300 drives the second reflective mirror 310 to rotate until the modulated light beam LM is projected onto the screen 23 through one of the projection lenses 22, to form images. Then, the second substrate 300 suspends all motion to establish a stable projection on the screen 23 and to place a projected image in a particular location on the screen 23, that is, until positional adjustment of the images on the screen 23 has been carried out. In this case, the second substrate 300 drives the second reflective mirror 310 to adjust the range of the images on the screen 23.

It will be understood that the above particular embodiments are shown and described by way of illustration only. The principles and the features of the present disclosure can be employed in various and numerous embodiments thereof without departing from the scope of the disclosure. The above-described embodiments are not intended to limit the scope of the following claims.

What is claimed is:

1. A rapidscan device, comprising:
   a base;
   a first substrate positioned on the base;
   a first reflective mirror formed on the first substrate by a micro electro-mechanical system (MEMS) technology and configured for receiving a light beam and rotating in two direction under control of the MEMS for reflect the light beam to scanning in two direction to form a modulated light beam in a range;
   a second substrate positioned on the base, adjacent to the first substrate, and
   a second reflective mirror formed on the second substrate and substantially facing the first reflective mirror to receive the modulated light beam, the second substrate driving the second reflective mirror to rotate, thus adjusting a direction of the modulated light beam reflected off the second reflective mirror.

2. The rapidscan device of claim 1, wherein the second reflective mirror is formed by the MEMS technology.

3. The rapidscan device of claim 2, wherein an included angle between the second surface and the third surface falls into a range from about 90 to 150 degrees.

4. The rapidscan device of claim 1, wherein the base includes a first surface, the first substrate includes a second surface in which the first reflective mirror is formed, the second substrate includes a third surface in which the second reflective mirror is formed, the first substrate and the second substrate are positioned on the first surface, and the second surface, the third surface, and an axis on which the second reflective mirror rotates are substantially perpendicular with the first surface.

5. The rapidscan device of claim 1, wherein the first substrate directly contacts the base.

6. The rapidscan device of claim 5, wherein the second substrate directly contacts the base.

7. The rapidscan device of claim 1, wherein the second mirror is perpendicular to the base during rotation of the second mirror.

8. A projector, comprising:
a light source for emitting a light beam;
a rapidscan device positioned in a light path of the light beam, the rapidscan device comprising:
a base;
a first substrate positioned on the base;
a first reflective mirror formed on the first substrate by a micro electro-mechanical system (MEMS) technology and configured for receiving the light beam and rotating in two direction under control of the MEMS for reflect the light beam to scanning in two direction to form an modulated light beam in a range;
a second substrate positioned on the base, adjacent to the first substrate, and
a second reflective mirror formed on the second substrate and substantially facing the first reflective mirror to receive the modulated light beam, the second substrate driving the second reflective mirror to rotate, thus adjusting a direction of the modulated light beam reflected off the second reflective mirror;
an array of projections lenses and a screen arranged along a light path of the modulated light beam, one of the projection lenses projecting the modulated light beam onto the screen as images.

9. The projector of claim 8, wherein the first substrate directly contacts the base.

10. The projector of claim 9, wherein the first substrate directly contacts the base.

11. The projector of claim 8, wherein the second mirror is perpendicular to the base during rotation of the second mirror.

12. A rapidscan device, comprising:
a base;
a first substrate positioned on the base;
a first reflective mirror formed on the first substrate, configured for receiving a light beam and bi-directional rotation under control of a MEMS in order to reflect the light beam in two directions;
a second substrate positioned on the base, adjacent to the first substrate, and
a second reflective mirror formed on the second substrate, the second reflective mirror substantially facing the first reflective mirror to receive a beam therefrom,
wherein the second substrate is configured to drive the second reflective mirror to rotate, thereby adjusting a direction of the received beam.

13. The rapidscan device of claim 12, wherein the first substrate directly contacts the base.

14. The rapidscan device of claim 13, wherein the second substrate directly contacts the base.

15. The rapidscan device of claim 12, wherein the second mirror is perpendicular to the base during rotation of the second mirror.

* * * * *